United States Patent
Duffy et al.

(10) Patent No.: US 12,190,747 B2
(45) Date of Patent: Jan. 7, 2025

(54) DIGITAL WRITING SYSTEMS AND METHODS

(71) Applicants: SOCIETE BIC, Clichy (FR); Bic Violex S.A., Anoixi (GR)

(72) Inventors: David Duffy, Clichy (FR); Christopher-John Wright, Clichy (FR); Ion-Ioannis Antonakis, Anoixi (GR)

(73) Assignees: SOCIÉTÉ BIC, Clichy (FR); BIC Violex Single Member S.A., Anoixi (GR)

( * ) Notice: Subject to any disclaimer, the term of this patent is extended or adjusted under 35 U.S.C. 154(b) by 466 days.

(21) Appl. No.: 17/575,556

(22) Filed: Jan. 13, 2022

(65) Prior Publication Data
US 2022/0254272 A1 Aug. 11, 2022

(30) Foreign Application Priority Data
Feb. 10, 2021 (EP) ..................................... 21305179

(51) Int. Cl.
*G09B 19/00* (2006.01)
*G09B 7/02* (2006.01)

(52) U.S. Cl.
CPC ............... *G09B 19/00* (2013.01); *G09B 7/02* (2013.01)

(58) Field of Classification Search
CPC .................................. G09B 19/00; G09B 7/02
See application file for complete search history.

(56) References Cited

U.S. PATENT DOCUMENTS

| | | | | |
|---|---|---|---|---|
| 2003/0076352 | A1* | 4/2003 | Uhlig | G09B 5/00 715/738 |
| 2005/0017453 | A1* | 1/2005 | Rehbein | G09B 19/22 273/299 |
| 2008/0085501 | A1* | 4/2008 | Novack | G09B 7/02 434/322 |
| 2011/0065082 | A1 | 3/2011 | Gal et al. | |
| 2012/0212423 | A1* | 8/2012 | Dondurur | G06F 3/04883 345/173 |
| 2017/0060406 | A1* | 3/2017 | Rucine | G06V 30/1423 |

OTHER PUBLICATIONS

Extended European Search Report issued on Aug. 4, 2021 in counterpart European Patent Application No. 21305179.0.

\* cited by examiner

*Primary Examiner* — David L Lewis
*Assistant Examiner* — Shauna-Kay Hall
(74) *Attorney, Agent, or Firm* — Bookoff McAndrews, PLLC

(57) ABSTRACT

The present specification relates to a computer-implemented method for providing at least one note taking user interface setting for a digital writing system, comprising obtaining at least one time series of data related to a progression of an education resource, recognizing the education resource based on the at least one time series of data, thereby yielding an education resource identifier specifying the education resource, selecting the at least one note taking user interface setting for the digital writing system based on the education resource identifier, and applying the at least one note taking user interface setting for the digital writing system as the education resource progresses, wherein the at least one note taking user interface setting for the digital writing system is deemed to be conducive to a learning success based on other users' having taken notes for the education resource.

20 Claims, 4 Drawing Sheets

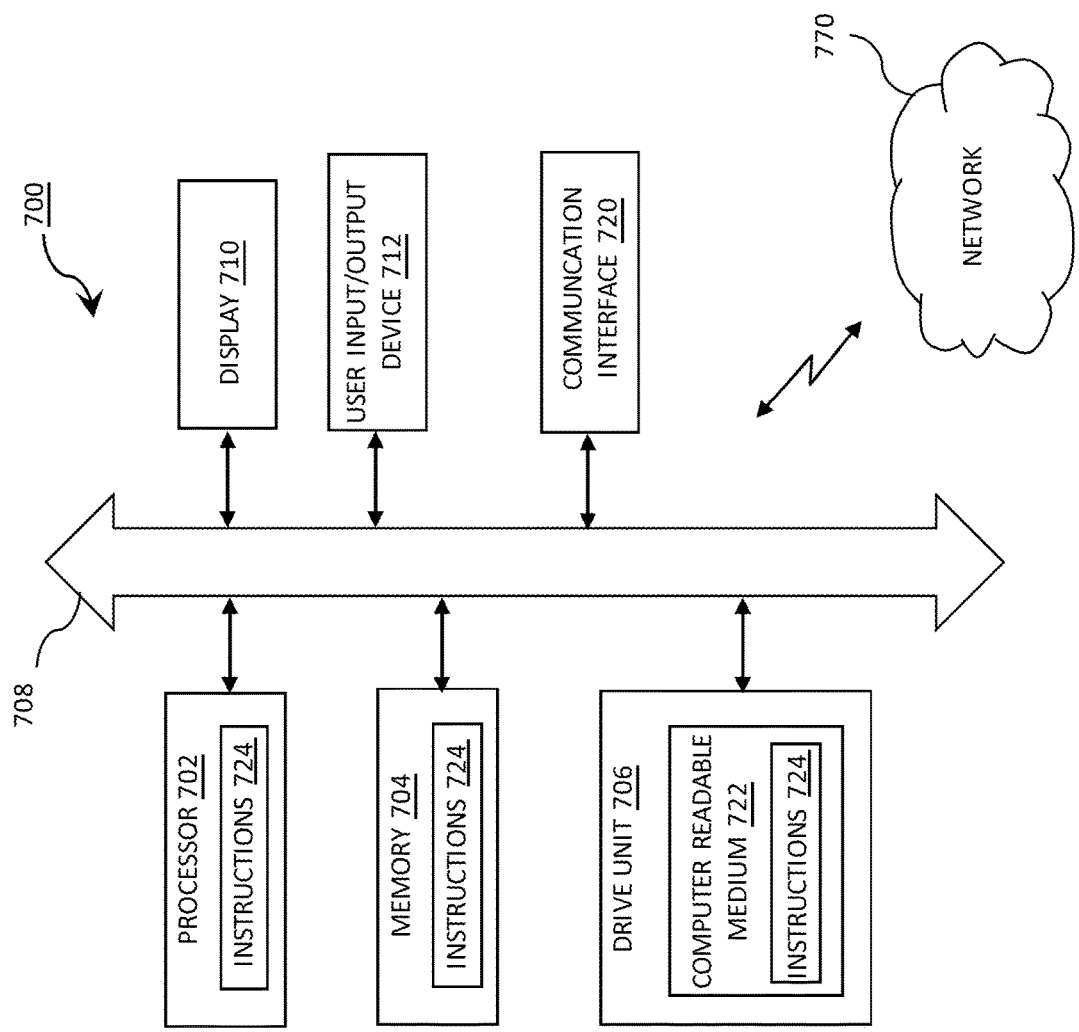

DIGITAL WRITING SYSTEMS AND METHODS

CROSS REFERENCE TO RELATED APPLICATIONS

This application claims priority from European patent application No. 21305179.0, filed on Feb. 10, 2021, the contents of which are hereby incorporated herein in their entirety by this reference.

TECHNICAL FIELD

This specification relates to a computer-implemented method for providing note taking user interface settings for a digital writing system, to a digital writing system for taking notes based on an education resource, and to an education resource system in a cloud.

BACKGROUND

Note taking is an important means to digest educational (e.g. a lecture) or non-educational content (e.g. meeting minutes). There are well-known note taking strategies which have differing strengths and weaknesses. The strategy that a note taker (e.g. a student) uses to take notes as well as the form of note taking prompts in a digital note taking system therefore affects the quality and type of understanding of the material which the note taker gains. A viewing strategy, such as playback speed, pausing and rewinding, used when consuming an educational video can also influence the student's understanding of the material.

Recently, artificial intelligence algorithms have evolved that are capable of gaining an understanding of written and/or oral information. As an example, in some cases the understanding gained from artificial intelligence competes with or exceeds the one by human beings. Furthermore, artificial intelligence is known to be capable of answering detailed questions on a text and/or a speech. Furthermore, artificial intelligence can itself generate questions and corresponding correct answers, thereby providing the means to automatically test the understanding of a human being.

SUMMARY

According to a first aspect, there is provided a computer-implemented method for providing at least one note taking user interface setting for a digital writing system. The method comprises obtaining at least one time series of data related to a progression of an education resource. The method further comprises recognizing the education resource based on the at least one time series of data, thereby yielding an education resource identifier specifying the education resource. The method further comprises selecting the at least one note taking user interface setting for the digital writing system based on the education resource identifier. The method further comprises applying the at least one note taking user interface setting for the digital writing system as the education resource progresses. The at least one note taking user interface setting for the digital writing system is deemed to be conducive to a learning success based on other users' having taken notes for the education resource.

According to a second aspect, there is provided a digital writing system for taking notes based on an education resource comprising a user interface and an input device configured to acquire data corresponding to the education resource. The digital writing system is configured to run the computer-implemented method of the first aspect (or an embodiment thereof) for providing at least one note taking user interface setting.

According to a third aspect, there is provided an education resource system in a cloud comprising an education resource database and a note taking user interface database. The education resource system further comprises at least one communication interface configured for data exchange with at least one digital writing system of the second aspect (or an embodiment thereof) for taking notes based on an education resource.

Dependent embodiments of the aforementioned aspects are given in the dependent claims and explained in the following description, to which the reader should now refer.

The method 100 of the first aspect (or an embodiment thereof) and the digital writing system 200 of the second aspect (or an embodiment thereof) and the education resource system 300 of the third aspect are directed towards providing functionality for determining, applying and/or distributing (network) note taking strategies capable of maximizing a learning result for a user following an education resource 10. In fact, means are provided to prompt users of the digital writing system 200 to use note taking strategies which are likely to result in a better understanding of the educational content of the education resource 10. Appropriate note taking strategies for a given education resource 10 may be predetermined (e.g. by a teacher or an author of the education resource 10) and/or result from previous experiences of other users having studied the same education resource 10. In either case, in order to reduce a subjective component of which note taking strategy fits best, means for user assessment, e.g. via a network with the education resource system 300 in a cloud, may also be provided. In so doing, learning results can be correlated to the one or more note taking strategies for the given education resource 10 and an optimal/ideal note taking strategy may be derived from such correlation data. In fact, as an example, in case of frequented education resources 10 (such as e.g. an educational video on a popular YouTube education channel) user assessment may yield rather accurate results— along the lines of collective/crowd intelligence—as to which note taking strategy is deemed conducive to a learning success for the education resource 10 or a particular section thereof. This overcomes the common problem that a user experiencing new educational content has often no chance to know in advance the ideal note taking strategy or the timing of note taking because the user does not know the details of the upcoming information.

A note taking strategy may comprise one or more note taking user interface settings 30 for the user interface 210 of the digital writing system 200. As an example, the one or more note taking user interface settings 30 may be used to implement a note taking template and/or a doze for the education resource 10 or sections thereof. In case of the education resource 10 being an audio and/or visual sequence, the one or more note taking user interface settings 30 may also comprise suggestions for user control for the audio and/or visual sequence (e.g. pausing). Furthermore, note taking user interface settings 30 may be chosen so as to implement a concept of note taking (e.g. verbatim learning versus high-level mechanistic comprehension). Providing optimal/ideal note taking user interface settings 30 may also produce better layout and readability of written notes which may facilitate later revision and re-visitation of the notes.

Note taking while following an education resource 10 is typically a lossy process in that given the somewhat limited multitasking capabilities of a human brain there can be a trade-off between jottings things down and digesting newly incoming content of the education resource 10. In one instance, it is challenging for the student to keep up with the educational video while taking notes and correlate the notes with the correct part of the video. The student may need to manually pause and rewind through the video to find a location where a note was taken, this process is inefficient and time-consuming. As an example, such may lead to a suboptimal timing of writing versus listening and/or a suboptimal structuring of the written notes both of which may hamper future use of the notes rendering them less telling and thus less beneficial to the user in the long run. However, it is in providing optimal/ideal note taking strategies as the education resource 10 progresses and based on other users' experience on the same education resource 10 that an optimal trade-off can be provided that maximizes the learning success and thereby also enhances formation and retention of knowledge and understanding. Implementations described herein may provide optimal/ideal note taking strategies to users in an efficient and time-saving manner by taking advantage of modern technology infrastructure.

FIGURE DESCRIPTION

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

FIG. 1 schematically illustrates a computer-implemented method according to the first aspect (or an embodiment thereof) for providing at least one note taking user interface setting for a digital writing system.

FIG. 2 schematically illustrates a digital writing system according to the second aspect (or an embodiment thereof) for taking notes based on an education resource.

FIG. 3 schematically illustrates an education resource system in a cloud according to the third aspect.

FIG. 4 schematically illustrates an embodiment of the computer-implemented method according to the first aspect.

FIG. 7 illustrates an implementation of a general computer system that may execute techniques presented herein.

DETAILED DESCRIPTION

Figure 5:
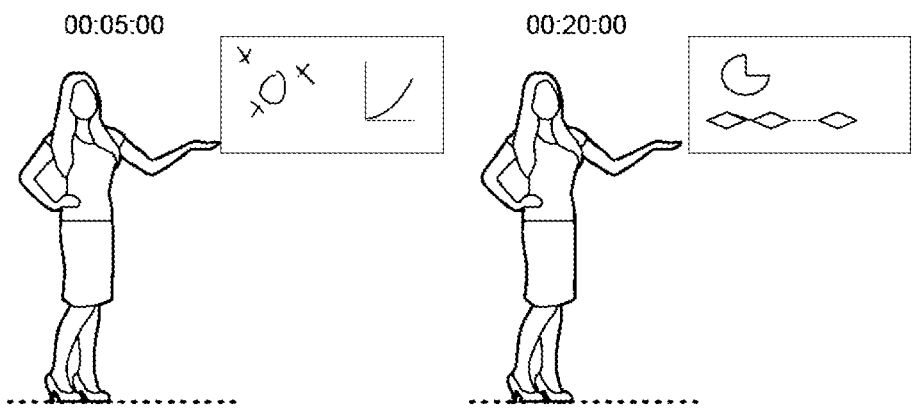
FIG. 5 illustrates an example of a digital writing system providing at least one note taking user interface setting while consuming an educational resource.
Figure 5:
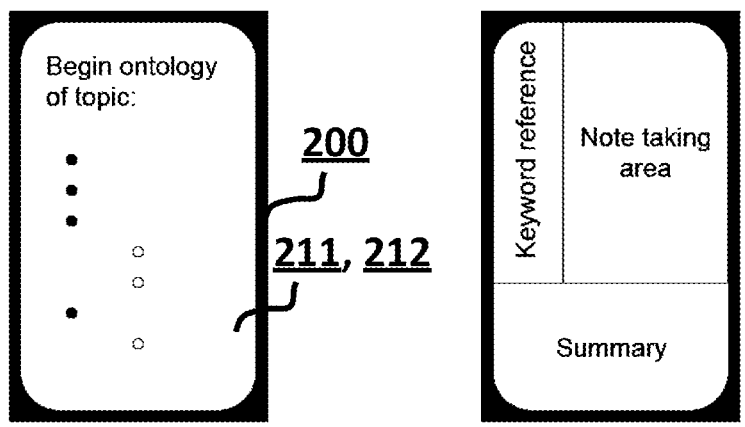

The method 100 of the first aspect (or an embodiment thereof) and the digital writing system 200 of the second aspect (or an embodiment thereof) and the education resource system 300 of the third aspect aim at providing functionality for determining, applying and/or distributing (network) note taking strategies. An example of applying different note taking strategies to a user of a digital writing system 200 while consuming an education resource 10 is shown in FIG. 5.

Figure 1:
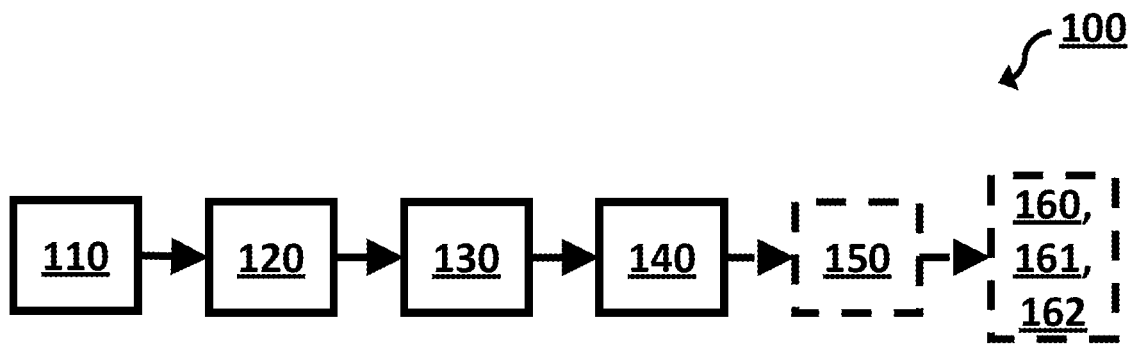
Figure 4:
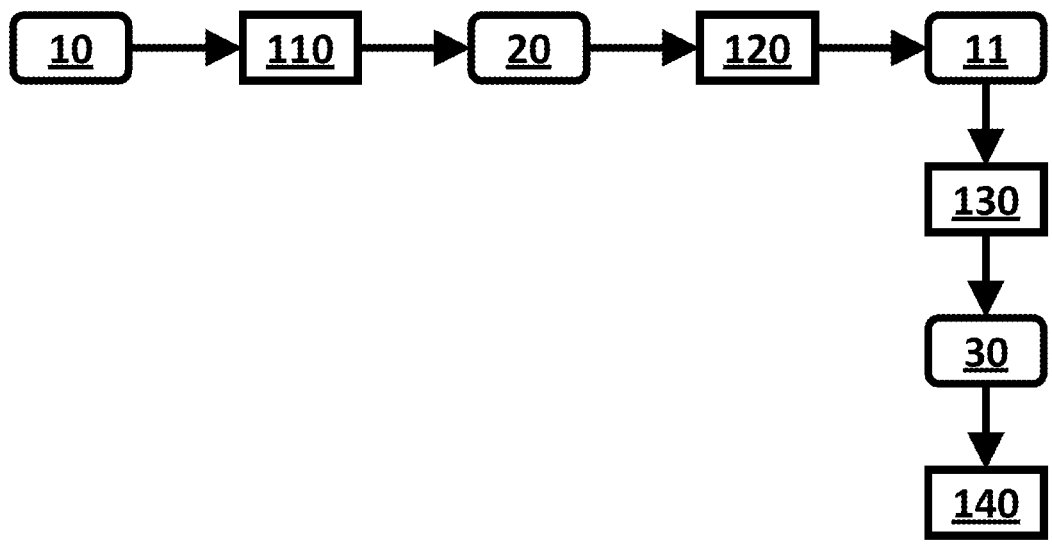

The computer-implemented method 100 for providing at least one note taking user interface setting 30 for a digital writing system 200 comprises obtaining 110 at least one time series 20 of data related to a progression of an education resource 10. The method 100 further comprises recognizing 120 the education resource 10 based on the at least one time series 20 of data, thereby yielding an education resource identifier 11 specifying the education resource 10. The method further comprises selecting 130 the at least one note taking user interface setting 30 for the digital writing system 200 based on the education resource identifier 11. The method further comprises applying 140 the at least one note taking user interface setting 30 for the digital writing system 200 as the education resource 10 progresses. The at least one note taking user interface setting 30 for the digital writing system 200 is deemed to be conducive to a learning success based on other users' having taken notes for the education resource 10. The computer-implemented method 100 is schematically illustrated in FIG. 1 and FIG. 4.

The education resource 10 may be an audio sequence and/or a visual sequence. As an example, the audio sequence is interpretable in terms of a natural language. The audio sequence and/or visual sequence may, for example, be queried from an education resource database (e.g. "YouTube" or an amalgamation of education resources from multiple sources). The education resource 10 may comprise content a user of the digital writing system 200 wishes to memorize or learn from. As an example, the content is repeatable. The education resource 10 may comprise content of a lesson or a lecture.

The education resource 10 may be played via a user interface 210 of the digital writing system 200, for example, via at least one speaker 213 and/or via a graphical user output 212 of the user interface 210. In examples, the education resource 10 may be independent of the digital writing system (e.g. played on another device).

The one or more time series 20 of data related to the progression of the education resource 10 may comprise an audio time series (e.g. in case the education resource 10 comprises or is an audio sequence) captured by at least one microphone 221 of the digital writing system 200 as the education resource 10 progresses. The one or more time series 20 of data related to the progression of the education resource 10 may comprise a video time series (e.g. in case the education resource 10 comprises or is a visual sequence, e.g. a video) captured by at least one camera 222 of the digital writing system 200 as the education resource 10 progresses. The one or more time series 20 of data related to the progression of the education resource 10 may comprise an ambient light time series (e.g. in case the education resource 10 comprises or is a visual sequence, e.g. a video) captured by at least one ambient light sensor 223 of the digital writing system 200 as the education resource 10 progresses. The one or more time series 20 of data related to the progression of the education resource 10 may comprise the audio sequence and/or the visual sequence played by the user interface 210 of the digital writing system 200. Alternatively, or in addition, the one or more time series 20 of data related to the progression of the education resource 10 may comprise note taking data of the user of the digital writing system 200.

Recognizing 120 the education resource 10 based on the at least one time series 20 of data may comprise applying an education resource recognition algorithm configured to compare the one or more time series 20 of data, or one or more portions thereof (e.g. segments of 5 seconds suitable for a matching operation), to predetermined time series of data related to predetermined education resources, or portions thereof. The education resource recognition algorithm may be further configured to find a matching predetermined time series of data related to a predetermined education resource, or a matching portion thereof, thereby yielding the education resource identifier 11 specifying the education resource 10.

The predetermined time series of the data related to the predetermined education resources, or the portions thereof, may be queried from an education resource database. The education resource database may or may not be part of the digital writing system 200. In the latter case, the education resource database may be in an education resource system 300 in a cloud and may be accessed via communication interfaces 230, 310 of the digital writing system 200 or the education resource system 300, respectively.

Comparing the one or more time series 20 of data, or the one or more portions thereof, to the predetermined time series of data related to the predetermined education resources, or the portions thereof, may take user control commands such as pausing, rewinding, fast-forwarding, stopping, and/or switching the education resource 10 into account. The education resource identifier 11 may be updated upon identifying a new education resource 10, wherein for example the new education resource may result from switching the education resource 10 (e.g. choosing another video). Alternatively, or in addition, the matching operation may take user information into account. As an example, the user information may comprise a title of the education resource 10 inputted by a user interaction via the user interface 210 of the digital writing system 200. The predetermined time series of the data related to the predetermined education resources, or the portions thereof, may comprise predetermined audio sequences and/or predetermined visual sequences of the education resources 10. The predetermined time series of the data related to the predetermined education resources, or the portions thereof, may comprise predetermined note taking data, or portions thereof, acquired from one or more further users of further digital writing systems 200.

Finding the matching predetermined time series of data related to the predetermined education resource, or the matching portion thereof, may only be based on the predetermined note taking data, or the portions thereof, acquired from the one or more further users of the further digital writing systems 200. Such may apply in case where no (genuine) education resource data (the video that is being played) is available to the digital writing system 200.

Selecting 130 the at least one note taking user interface setting 30 for the digital writing system 200 based on the education resource identifier 11 may comprise querying at least one predetermined note taking user interface setting 30 for the digital writing system 200 from a note taking user interface database, wherein the at least predetermined note taking user interface setting 30 has been preselected (e.g. by a cronjob on a cloud server) for the education resource identifier 11, thereby selecting 130 the at least one note taking user interface setting 30.

In examples, selecting 130 the at least one note taking user interface setting 30 for the digital writing system 200 based on the education resource identifier 11 may comprise applying a note strategy algorithm configured to query, based on the education resource identifier 11, one or more predetermined note taking user interface settings 30 for the digital writing system 200 and corresponding note taking performance data scores from a note taking user interface database, and to select at least one predetermined note taking user interface setting 30 based on the corresponding note taking performance data scores, thereby selecting 130 the at least one note taking user interface setting 30. Alternatively, or in addition, the note strategy algorithm may run (in advance) in the cloud.

The note taking user interface database may or may not be part of the digital writing system 200. In the latter case, the note taking user interface database may be in an education resource system 300 in a cloud and may be accessed via communication interfaces 230, 310 of the digital writing system 200 or the education resource system 300, respectively.

Selecting the one or more predetermined note taking user interface settings 30 based on the corresponding note taking performance data scores may result from a maximization of an overall note taking performance data score dependent on the corresponding note taking performance data scores. As an example, the overall note taking performance data score may be a weighted sum or an average of the corresponding note taking performance data scores.

Alternatively, or in addition, selecting the at least one predetermined note taking user interface setting 30 may (also) be based on one or more user-defined preferences set via the user interface 210 of the digital writing system 200. In so doing, personal preferences of the user can be taken into account, thereby maximizing the learning success. The one or more user-defined preferences may be set for the current and/or future sessions of usage.

As an example, note taking performance data within the education resource database may be grouped into different student types, wherein the grouped students display similar performance profiles across different note taking user interface settings 30 and/or education resources 10. In each group (ideal) one or more predetermined note taking user interface settings 30 may be selected. In this context, a user-defined preference may comprise choosing a group of different student types, thereby selecting the one or more predetermined note taking user interface settings.

The one or more note taking user interface settings 30 for the digital writing system 200 may implement a note taking template on the user interface 210, e.g. on a user input subsystem 211 thereof. The note taking template may arrange the user interface 210 or a portion thereof, e.g. the user input subsystem 211 or a portion thereof, into a grid of one or more rows and/or columns. The grid of one or more rows and/or columns may feature cell merging. The one or more note taking user interface settings 30 for the digital writing system 200 may comprise pixel and/or range positions (e.g. in relative terms to account for various screen resolutions) of one or more objects to be displayed so as to implement the note taking template. Alternatively, or in addition the one or more note taking user interface settings 30 for the digital writing system 200 may comprise line and/or fill color of the one or more objects to be displayed so as to implement the note taking template. Alternatively, or in addition the one or more note taking user interface settings 30 for the digital writing system 200 may comprise transparency, intensity and/or order of the one or more objects to be displayed so as to implement the note taking template. The implementation of the note taking template on the user interface 210 may lead to a more efficient use (measured e.g. in terms of note taking performance data scores) of the user interface 210 (e.g. in case of a limited screen resolution).

Alternatively, or in addition, the one or more note taking user interface settings 30 for the digital writing system 200 may implement at least one doze on the user interface 210 corresponding to a section of the education resource 10 and to be filled by the user when taking notes as the education resource 10 progresses (i.e. during the education resource). Alternatively, or in addition, the one or more note taking user interface settings 30 for the digital writing system 200 may suggest a given bullet hierarchy for a section of the education resource 10. Alternatively, or in addition, the one or more note taking user interface settings 30 for the digital writing system 200 may comprise at least one suggestion for user control for the audio sequence and/or the visual sequence of the education resource 10, e.g. wherein the at least one suggestion invites the user to pause the audio sequence and/or the visual sequence at a given time, thereby allowing the user to spent more time on jotting down notes, thereby maximizing the learning effect. As an example, such an invitation to pause the audio sequence and/or the visual sequence may result from the analysis of one or more note taking performance data score from other users having studied the same education resource 10 and e.g. in case of a segment/portion of the education resource associated with a rather poor performance of the other users.

The method 100 may further comprise applying 150, as the education resource 10 progresses, a real-time note analyzing algorithm configured to spot a lack of a key point and/or a mistake corresponding to a section of the education resource 10, and, as an example, to give the user via the user interface 210 of the digital writing system 200 a hint on how to complete a missing key point and/or correct the mistake, and to invite and/or prompt the user via the user interface 210 of the digital writing system 200 to pause or rewind the audio sequence and/or the visual sequence in order to add more details and/or correct the mistake. The real-time note analyzing algorithm may comprise OCR/handwriting recognition and/or a machine learning algorithm pre-trained thereto. It may be based on notes taken by other users and/or inferred by an education resource comprehension algorithm (see below).

The method 100 may comprise, after the end of the education resource 10, applying 160 a user assessment algorithm configured to prompt the user of the digital writing system 200 to participate in a user assessment aimed at measuring a learning effect of the education resource 10, and to run the user assessment.

Running the user assessment may comprise querying, based on the education resource identifier 11, one or more predetermined assessment questions and corresponding one or more predetermined target answers from the education resource database, and prompting the user of the digital writing system 200 to provide one or more answers to the one or more predetermined assessment questions via the user interface 210 of the digital writing system 200, and evaluating the one or more answers provided by the user by comparing them to the one or more predetermined target answers, thereby computing at least one note taking performance data score. As an example, the at least one note taking performance data score can be a real number in the interval [0, 1].

Running the user assessment may comprise applying an education resource comprehension algorithm configured to generate one or more assessment questions and corresponding one or more target answers based on the education resource 10 specified by the education resource identifier 11, and prompting the user of the digital writing system 200 to provide one or more answers to the one or more generated assessment questions via the user interface 210 of the digital writing system 200, and evaluating the one or more answers provided by the user by comparing them to the generated corresponding one or more target answers, thereby computing at least one note taking performance data score. In examples, applying the education resource comprehension algorithm may be done in advance, e.g. in the cloud. The education resource comprehension algorithm may be a machine learning algorithm.

Alternatively, or in addition, the method 100 may further comprise, after the end of the education resource 10, applying 161 a user self-assessment algorithm configured to prompt the user to enter at least one note taking performance data score. Such user self-reporting may be simplified by requesting the user to input a rating or a score of how well they understand or remember the material at different time periods after the education resource 10.

The method 100 may further comprise, after the end of the education resource 10, applying 162 a user note assessment algorithm configured to analyze note taking data capturing the notes taken by the user, and to compute at least one note taking performance data score based on the note taking data and, for example, on the education resource 10 (e.g. on other note taking data or applying the education resource comprehension algorithm).

The user assessment algorithm, the user self-assessment algorithm and/or the user note assessment algorithm may or may not be applied within the digital writing system 200. In fact, any one of them may also be applied in a web browser independently of the digital writing system 200. After the end of the education resource 10 may relate to immediate user assessment (by one or more of the aforementioned algorithms, still after completion of the education resource 10) or, for example, to user assessment after an hour, a day, a week after the end of the education resource 10. In so doing, a bias in the user assessment resulting from short term memory effects of the user can be reduced or avoided. In addition, user assessment may be repeated e.g. in order to test memorization over a given period of time.

Alternatively, or in addition, note taking performance data scores may be computed section-wise (with respect to sections of the education resource 10). This may lead to switching note taking schemes from one section of the education resource to another. In fact, as an example, such a switch is illustrated in FIG. 5 (wherein at 5 minutes and at 20 minutes different note taking schemes are shown).

For the education resource identifier 11, the one or more note taking user interface settings 30 and the one or more note taking performance data scores may be uploaded to the note taking user interface database. Uploading the one or more note taking user interface settings 30 and the one or more note taking performance data scores may prove useful when it comes to selecting the at least one note taking user interface setting 30 for yet another user. Alternatively, or in addition, the one or more note taking performance data scores and/or note taking data capturing the notes taken by the user may be uploaded to the education resource database. Uploading the one or more note taking performance data scores and/or note taking data capturing the notes taken by the user may also prove useful when it comes to selecting the at least one note taking user interface setting 30 for yet another user (e.g. when the education resource 10 is not available to the digital writing system 200). Data uploaded to the education resource database may be timestamped in order to correlate the data to the education resource 10.

The digital writing system 200 for taking notes based on an education resource 10 comprises a user interface 210, and an input device 220 configured to acquire data corresponding to the education resource 10. The digital writing system 200 is configured to run the computer-implemented method 100 of the first aspect (or an embodiment thereof) for providing at least one note taking user interface setting 30.

Figure 2:
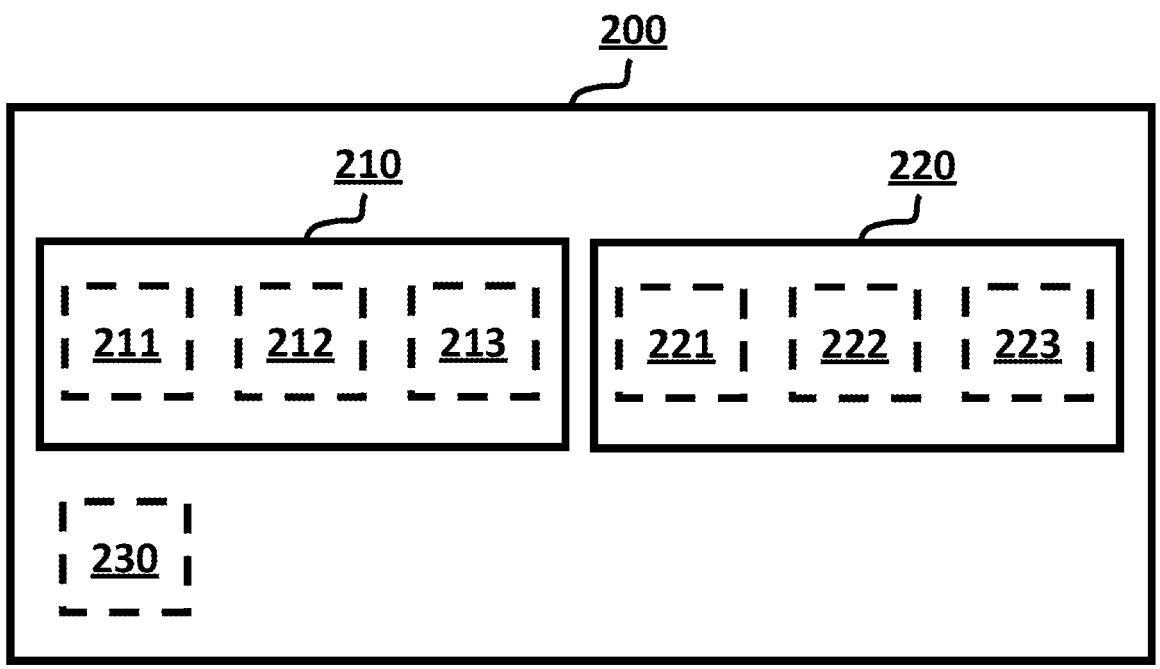

The digital writing system 200 is schematically illustrated in FIG. 2. The user interface 210 may comprise a user input subsystem 211 configured to capture note taking input from a user of the system 200. The user input subsystem 211 may comprise a smart pad, a touchpad, a touch screen, digital writing slate, or a graphics tablet configured to capture text written by hand or pen by the user. For example, user input subsystem 211 may be able to detect touch positions e.g. of a stylus or finger. In some embodiments the captured data may consist of higher-level information where text data is obtained after one or more pre-processing steps. As an example, captured data may consist of letter and word identifiers associated with positions on the screen and time point data.

Alternatively, or in addition, the user input subsystem 211 may comprise a keyboard or a virtual keyboard. Alternatively, or in addition, the user input subsystem 211 may comprise a cursor control, e.g. a mouse.

The user interface 210 may comprise a graphical user output 212. The graphical user output 212 may be part of the user input subsystem 211 (e.g. one screen for input and output). As an example, the graphical user output 212 can be used to play the visual sequence of the education resource 10. Alternatively, or in addition, the user interface 210 may comprise at least one speaker 213. As an example, the one or more speakers 213 may be used to play the audio sequence of the education resource 10.

The education resource 10 comprises or is an audio sequence and/or a visual sequence. Such sequences may result from live recording/streaming or may be pre-recorded. The input device 220 configured to acquire data corresponding to the education resource 10 may comprise at least one microphone 221. Alternatively, or in addition, the input device 220 configured to acquire data corresponding to the education resource 10 may comprise at least one camera 222 and/or at least one ambient light sensor 223. For example, if existing, the at least one microphone 221, the at least one camera 222, and/or the at least one ambient light sensor 223 may be used to acquire data corresponding to the education resource 10.

The system 200 may comprise at least one communication interface 230 configured for data exchange with a cloud, wherein as an example the cloud comprises an education resource database and/or a note taking user interface database. The at least one communication interface 230 may comprise one or more of a network, internet, a local area network, a wireless local area network, a broadband cellular network, and/or a wired network.

Figure 3:
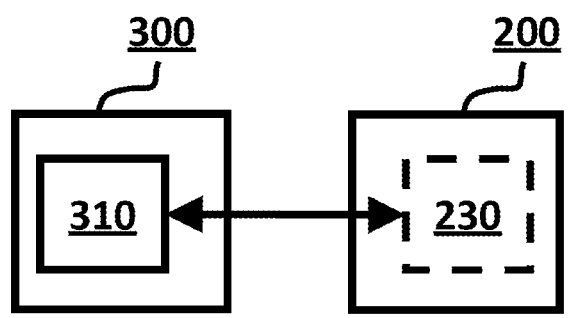

The education resource system 300 in a cloud may comprise an education resource database, a note taking user interface database, and at least one communication interface 310 configured for data exchange with at least one digital writing system 200 for taking notes based on an education resource 10 according to one of the embodiments 38 to 50. The at least one communication interface 310 may comprise one or more of a network, internet, a local area network, a wireless local area network, a broadband cellular network, and a wired network. The education resource system 300 is schematically illustrated in FIG. 3. The education resource system 300 in the cloud may be a server acquiring and providing data to one or more digital writing systems 200. In so doing, it can be the link and the foundation of bringing together different user experiences (i.e. experiences from one or more users e.g. each using a digital writing system 200 of their own). In fact, as a result, the at least one note taking user interface setting for the digital writing system may be deemed (as disclosed above) to be conducive to a learning success based on the other users' having (already) taken notes for the education resource 10.

Figure 6:
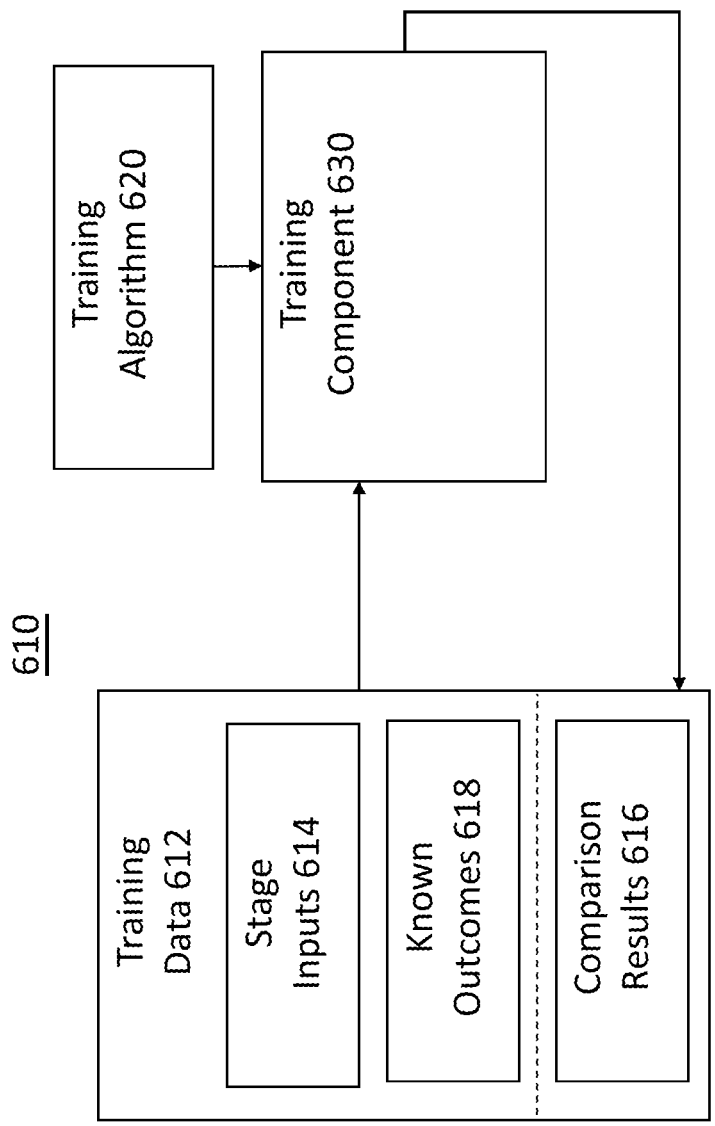
FIG. 6 shows an example machine learning training flow chart.

One or more implementations disclosed herein include and/or may be implemented using a machine learning model. For example, one or more of the artificial intelligence algorithm, education resource recognition algorithm, note strategy algorithm, real-time note analyzing algorithm, machine learning algorithm, education resource comprehension algorithm, user assessment algorithm, user self-assessment algorithm, and user note assessment algorithm may to be implemented using a machine learning model and/or may be used to train a machine learning model. A given machine learning model may be trained using the data flow 610 of FIG. 6. Training data 612 may include one or more of stage inputs 614 and known outcomes 618 related to a machine learning model to be trained. The stage inputs 614 may be from any applicable source including text, visual representations, data, values, comparisons, stage outputs (e.g., one or more outputs from a step from FIGS. 1, 2, 3, and/or 4). The known outcomes 618 may be included for machine learning models generated based on supervised or semi-supervised training. An unsupervised machine learning model may not be trained using known outcomes 618. Known outcomes 618 may include known or desired outputs for future inputs similar to or in the same category as stage inputs 614 that do not have corresponding known outputs.

The training data 612 and a training algorithm 620 (e.g., artificial intelligence algorithm, education resource recognition algorithm, note strategy algorithm, real-time note analyzing algorithm, machine learning algorithm, education resource comprehension algorithm, user assessment algorithm, user self-assessment algorithm, and user note assessment algorithm implemented using a machine learning model and/or may be used to train a machine learning model) may be provided to a training component 630 that may apply the training data 612 to the training algorithm 620 to generate a machine learning model. According to an implementation, the training component 630 may be provided comparison results 616 that compare a previous output of the corresponding machine learning model to apply the previous result to re-train the machine learning model. The comparison results 616 may be used by the training component 630 to update the corresponding machine learning model. The training algorithm 620 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

A machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIGS. 1, 2, 3, and/or 4 may be performed by one or more processors of a computer system as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

In various embodiments, one or more portions of methods 100, 200, and 300 may be implemented in, for instance, a chip set including a processor and a memory as shown in FIG. 7. FIG. 7 illustrates an implementation of a general computer system that may execute techniques presented herein. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video, or data communication. Further, while a computer system 700 is illustrated as a single system, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 700 may further include a display 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input/output device 712 configured to allow a user to interact with any of the components of computer system 700. The input/output device 712 may be a number pad, a keyboard, or a cursor control device, such as a mouse, or a joystick, touch screen display, remote control, or any other device operative to interact with the computer system 700.

The computer system 700 may also or alternatively include drive unit 706 implemented as a disk or optical drive. The drive unit 706 may include a computer-readable medium 722 in which one or more sets of instructions 724, e.g. software, can be embedded. Further, instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 770 can communicate voice, video, audio, images, or any other data over the network 770. Further, the instructions 724 may be transmitted or received over the network 770 via a communication port or interface 720, and/or using a bus 708. The communication port or interface 720 may be a part of the processor 702 or may be a separate component. The communication port or interface 720 may be created in software or may be a physical connection in hardware. The communication port or interface 720 may be configured to connect with a network 770, external media, the display 710, or any other components in computer system 700, or combinations thereof. The connection with the network 770 may be a physical connection, such as a wired Ethernet connection or may be established wirelessly as discussed below. Likewise, the additional connections with other components of the computer system 700 may be physical connections or may be established wirelessly. The network 770 may alternatively be directly connected to a bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random-access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to a network 770. The network 770 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 770 may include wide area networks (WAN), such as the Internet, local area networks (LAN), campus area networks, metropolitan area networks, a direct connection such as through a Universal Serial Bus (USB) port, or any other networks that may allow for data communication. The network 770 may be configured to couple one computing device to another computing device to enable communication of data between the devices. The network 770 may generally be enabled to employ any form of machine-readable media for communicating information from one device to another. The network 770 may include communication methods by which information may travel between computing devices. The network 770 may be divided into sub-networks. The sub-networks may allow access to all of the other components connected thereto or the sub-networks may restrict access between the components. The network 770 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present invention has been described above and is defined in the attached claims, it should be understood that the invention may alternatively be defined in accordance with the following embodiments:

1. A computer-implemented method (100) for providing at least one note taking user interface setting (30) for a digital writing system (200), comprising:
    obtaining (110) at least one time series (20) of data related to a progression of an education resource (10);
    recognizing (120) the education resource (10) based on the at least one time series (20) of data, thereby yielding an education resource identifier (11) specifying the education resource (10);
    selecting (130) the at least one note taking user interface setting (30) for the digital writing system (200) based on the education resource identifier (11);
    applying (140) the at least one note taking user interface setting (30) for the digital writing system (200) as the education resource (10) progresses;
    wherein the at least one note taking user interface setting (30) for the digital writing system (200) is deemed to be conducive to a learning success based on other users' having taken notes for the education resource (10).

2. The method (100) of embodiment 1, wherein the education resource (10) is an audio sequence and/or a visual sequence, wherein the audio sequence is interpretable in terms of a natural language.
3. The method (100) of embodiment 1 or 2, wherein the education resource (10) comprises content a user of the digital writing system (200) wishes to memorize or learn from, wherein the content is repeatable.
4. The method (100) of one of the preceding embodiments, wherein the education resource (10) comprises content of a lesson or a lecture.
5. The method (100) of one of the preceding embodiments, wherein the education resource (10) is played via a user interface (210) of the digital writing system (200) via at least one speaker (213) and/or via a graphical user output (212) of the user interface (210).
6. The method (100) of one of the preceding embodiments, wherein the one or more time series (20) of data related to the progression of the education resource (10) comprise an audio time series captured by at least one microphone (221) of the digital writing system (200) as the education resource (10) progresses.
7. The method (100) of one of the preceding embodiments, wherein the one or more time series (20) of data related to the progression of the education resource (10) comprise a video time series captured by at least one camera (222) of the digital writing system (200) as the education resource (10) progresses.
8. The method (100) of one of the preceding embodiments, wherein the one or more time series (20) of data related to the progression of the education resource (10) comprise an ambient light time series captured by at least one ambient light sensor (223) of the digital writing system (200) as the education resource (10) progresses.
9. The method (100) of one of the preceding embodiments, when dependent on embodiment 5, wherein the one or more time series (20) of data related to the progression of the education resource (10) comprise the audio sequence and/or the visual sequence played by the user interface (210) of the digital writing system (200).
10. The method (100) of one of the preceding embodiments, wherein the one or more time series (20) of data related to the progression of the education resource (10) comprise note taking data of the user of the digital writing system (200).
11. The method (100) of one of the preceding embodiments, wherein recognizing (120) the education resource (10) based on the at least one time series (20) of data comprises applying an education resource recognition algorithm configured to compare the one or more time series (20) of data, or one or more portions thereof, to predetermined time series of data related to predetermined education resources, or portions thereof.
12. The method (100) of embodiment 11, wherein the education resource recognition algorithm is further configured to find a matching predetermined time series of data related to a predetermined education resource, or a matching portion thereof, thereby yielding the education resource identifier (11) specifying the education resource (10).
13. The method (100) of embodiment 11 or 12, wherein the predetermined time series of the data related to the predetermined education resources, or the portions thereof, are queried from an education resource database.
14. The method (100) of one of the embodiments 11 to 13, wherein comparing the one or more time series (20) of data, or the one or more portions thereof, to the predetermined time series of data related to the predetermined education resources, or the portions thereof, takes user control commands such as pausing, rewinding, fast-forwarding, stopping, and/or switching the education resource (10) into account.
15. The method (100) of embodiment 14, when dependent on embodiment 12, wherein the education resource identifier (11) is updated upon identifying a new education resource (10).
16. The method (100) of one of the embodiments 12 to 15, wherein the matching operation takes user information into account, wherein the user information comprises a title of the education resource (10) inputted by a user interaction via the user interface (210) of the digital writing system (200).
17. The method (100) of one of the embodiments 11 to 16, wherein the predetermined time series of the data related to the predetermined education resources, or the portions thereof, comprise predetermined audio sequences and/or predetermined visual sequences of the education resources (10).
18. The method (100) of one of the embodiments 11 to 16, wherein the predetermined time series of the data related to the predetermined education resources, or the portions thereof, comprise predetermined note taking data, or portions thereof, acquired from one or more further users of further digital writing systems (200).
19. The method (100) of embodiment 18, when dependent on embodiment 12, wherein finding the matching predetermined time series of data related to the predetermined education resource, or the matching portion thereof, is only based on the predetermined note taking data, or the portions thereof, acquired from the one or more further users of the further digital writing systems (200).
20. The method (100) of one of the preceding embodiments, wherein selecting (130) the at least one note taking user interface setting (30) for the digital writing system (200) based on the education resource identifier (11) comprises querying at least one predetermined note taking user interface setting (30) for the digital writing system (200) from a note taking user interface database, wherein the at least predetermined note taking user interface setting (30) has been preselected for the education resource identifier (11), thereby selecting (130) the at least one note taking user interface setting (30).
21. The method (100) of one of the embodiments 1 to 19, wherein selecting (130) the at least one note taking user interface setting (30) for the digital writing system (200) based on the education resource identifier (11) comprises applying a note strategy algorithm configured:
    to query, based on the education resource identifier (11), one or more predetermined note taking user interface settings (30) for the digital writing system (200) and corresponding note taking performance data scores from a note taking user interface database; and
    to select at least one predetermined note taking user interface setting (30) based on the corresponding note taking performance data scores; thereby selecting (130) the at least one note taking user interface setting (30).

22. The method (100) of embodiment 21, wherein selecting the one or more predetermined note taking user interface settings (30) based on the corresponding note taking performance data scores results from a maximization of an overall note taking performance data score dependent on the corresponding note taking performance data scores.

23. The method (100) of embodiment 21 or 22, wherein selecting the at least one predetermined note taking user interface setting (30) is also based on one or more user-defined preferences set via the user interface (210) of the digital writing system (200).

24. The method (100) of one of the preceding embodiments, wherein the one or more note taking user interface settings (30) for the digital writing system (200) implement a note taking template on the user interface (210) and/or on a user input subsystem (211) thereof.

25. The method (100) of embodiment 24, wherein the note taking template arrange the user interface (210) or a portion thereof, or the user input subsystem (211) or a portion thereof, into a grid of one or more rows and/or columns.

26. The method (100) of embodiment 24 or 25, wherein the one or more note taking user interface settings (30) for the digital writing system (200) comprise one or more of:
    pixel and/or range positions; and
    line and/or fill color; and
    transparency, intensity and/or order;
    of one or more objects to be displayed so as to implement the note taking template.

27. The method (100) of one of the preceding embodiments, wherein the one or more note taking user interface settings (30) for the digital writing system (200) implement at least one doze on the user interface (210) corresponding to a section of the education resource (10) and to be filled by the user when taking notes as the education resource (10) progresses.

28. The method (100) of one of the preceding embodiments, wherein the one or more note taking user interface settings (30) for the digital writing system (200) suggest a given bullet hierarchy for a section of the education resource (10).

29. The method (100) of one of the preceding embodiments, when dependent on embodiment 2, wherein the one or more note taking user interface settings (30) for the digital writing system (200) comprise at least one suggestion for user control for the audio sequence and/or the visual sequence of the education resource (10), wherein the at least one suggestion invites the user to pause the audio sequence and/or the visual sequence at a given time, thereby allowing the user to spent more time on jotting down notes.

30. The method (100) of one of the preceding embodiments, when dependent on embodiment 2, comprising applying (150), as the education resource (10) progresses, a real-time note analyzing algorithm configured:
    to spot a lack of a key point and/or a mistake corresponding to a section of the education resource (10); and
    to give the user via the user interface (210) of the digital writing system (200) a hint on how to complete a missing key point and/or correct the mistake; and
    to invite and/or prompt the user via the user interface (210) of the digital writing system (200) to pause or rewind the audio sequence and/or the visual sequence in order to add more details and/or correct the mistake.

31. The method (100) of one of the preceding embodiments, comprising, after the end of the education resource (10), applying (160) a user assessment algorithm configured:
    to prompt the user of the digital writing system (200) to participate in a user assessment aimed at measuring a learning effect of the education resource (10); and
    to run the user assessment.

32. The method (100) of embodiment 31, wherein running the user assessment comprises:
    querying, based on the education resource identifier (11), one or more predetermined assessment questions and corresponding one or more predetermined target answers from the education resource database; and
    prompting the user of the digital writing system (200) to provide one or more answers to the one or more predetermined assessment questions via the user interface (210) of the digital writing system (200); and
    evaluating the one or more answers provided by the user by comparing them to the one or more predetermined target answers,
    thereby computing at least one note taking performance data score.

33. The method (100) of embodiment 31, wherein running the user assessment comprises:
    applying an education resource comprehension algorithm configured to generate one or more assessment questions and corresponding one or more target answers based on the education resource (10) specified by the education resource identifier (11); and
    prompting the user of the digital writing system (200) to provide one or more answers to the one or more generated assessment questions via the user interface (210) of the digital writing system (200); and
    evaluating the one or more answers provided by the user by comparing them to the generated corresponding one or more target answers,
    thereby computing at least one note taking performance data score.

34. The method (100) of one of the preceding embodiments, comprising, after the end of the education resource (10), applying (161) a user self-assessment algorithm configured to prompt the user to enter at least one note taking performance data score.

35. The method (100) of one of the preceding embodiments, comprising, after the end of the education resource (10), applying (162) a user note assessment algorithm configured:
    to analyze note taking data capturing the notes taken by the user; and
    to compute at least one note taking performance data score based on the note taking data and/or on the education resource (10).

36. The method (100) of one of the embodiments 32 to 35, when dependent on embodiment 20 or 21, wherein, for the education resource identifier (11), the one or more note taking user interface settings (30) and the one or more note taking performance data scores are uploaded to the note taking user interface database.

37. The method (100) of one of the embodiments 32 to 36, wherein the one or more note taking performance data scores and/or note taking data capturing the notes taken by the user are uploaded to the education resource database.

38. A digital writing system (200) for taking notes based on an education resource (10) comprising:
    a user interface (210); and
    an input device (220) configured to acquire data corresponding to the education resource (10); and
    wherein the digital writing system (200) is configured to run the computer-implemented method (100) for providing at least one note taking user interface setting (30) according to one of the preceding embodiments.

39. The system (200) of embodiment 38, wherein the user interface (210) comprises a user input subsystem (211) configured to capture note taking input from a user of the system (200).

40. The system (200) of embodiment 39, wherein the user input subsystem (211) comprises a smart pad, a touchpad, a touch screen, digital writing slate, or a graphics tablet configured to capture text written by hand or pen by the user.

41. The system (200) of embodiment 39 or 40, wherein the user input subsystem (211) comprises a keyboard or a virtual keyboard.

42. The system (200) of one of the embodiments 39 to 41, wherein the user input subsystem (211) comprises a cursor control.

43. The system (200) of one of the embodiments 38 to 42, wherein the user interface (210) comprises a graphical user output (212).

44. The system (200) of embodiment 43, when dependent on embodiment 39, wherein the graphical user output (212) is part of the user input subsystem (211).

45. The system (200) of one of the embodiments 38 to 44, wherein the user interface (210) comprises at least one speaker (213).

46. The system (200) of one of the embodiments 38 to 45, wherein the education resource (10) comprises an audio sequence and/or a visual sequence.

47. The system (200) of one of the embodiments 38 to 46, wherein the input device (220) configured to acquire data corresponding to the education resource (10) comprises at least one microphone (221).

48. The system (200) of one of the embodiments 38 to 47, wherein the input device (220) configured to acquire data corresponding to the education resource (10) comprises at least one camera (222) and/or at least one ambient light sensor (223).

49. The system (200) of one of the embodiments 38 to 48, comprising at least one communication interface (230) configured for data exchange with a cloud, the cloud comprising an education resource database and a note taking user interface database.

50. The system (200) of embodiment 49, wherein the at least one communication interface (230) comprises one or more of a network, internet, a local area network, a wireless local area network, a broadband cellular network, and a wired network.

51. An education resource system (300) in a cloud comprising:
    an education resource database; and
    a note taking user interface database; and
    at least one communication interface (310) configured for data exchange with at least one digital writing system (200) for taking notes based on an education resource (10) according to one of the embodiments 38 to 50.

REFERENCE NUMERALS 10 education resource
11 education resource identifier
20 time series of data related to a progression of an educational resource
30 note taking user interface setting
100 computer-implemented method for providing at least one note taking user interface setting for a digital writing system
110 obtaining at least one time series of data related to a progression of an education resource
120 recognizing the education resource based on the at least one time series of data
130 selecting the at least one note taking user interface setting for the digital writing system based on the education resource identifier
140 applying the at least one note taking user interface setting for the digital writing system as the education resource progresses
150 applying a real-time note analyzing algorithm
160 applying a user assessment algorithm
161 applying a user self-assessment algorithm
162 applying a user note assessment algorithm
200 digital writing system for taking notes based on an education resource
210 user interface
211 user input subsystem
212 graphical user output
213 speaker
220 input device
221 microphone
222 camera
223 ambient light sensor
230 communication interface
300 education resource system in a cloud
310 communication interface

The invention claimed is:

1. A computer-implemented method for providing at least one note taking user interface setting for a digital writing system, comprising:
    obtaining at least one time series of data related to a progression of an education resource, wherein the at least one time series of data includes an audio time series captured by at least one microphone, a video time series captured by at least one camera, or an ambient light time series captured by at least one ambient light sensor during the progression of the education resource;
    recognizing, by utilizing an education resource recognition algorithm, the education resource based on the at least one time series of data, thereby yielding an education resource identifier specifying the education resource;
    selecting, by utilizing a note strategy algorithm, the at least one note taking user interface setting for the digital writing system based on the education resource identifier;
    modifying the at least one note taking user interface setting based on aggregated note-taking data from other users interacting with the education resource;

applying the at least one modified note taking user interface setting for the digital writing system as the education resource progresses; and generating or updating a note taking template in a user interface of the digital writing system based on the at least one modified note taking user interface setting.

2. The computer-implemented method of claim 1, wherein the education resource is an audio sequence and/or a visual sequence.

3. The computer-implemented method of claim 1, wherein the education resource is played via the user interface of the digital writing system.

4. The computer-implemented method of claim 1, wherein one or more of the at least one time series of data related to the progression of the education resource comprises note taking data of a user of the digital writing system.

5. The computer-implemented method of claim 1, wherein recognizing the education resource based on the at least one time series of data comprises applying the education resource recognition algorithm configured to compare the at least one time series of data, or one or more portions thereof, to predetermined time series of data related to predetermined education resources, or portions thereof.

6. The computer-implemented method of claim 5, wherein the education resource recognition algorithm is further configured to find a matching predetermined time series of data related to a predetermined education resource, or a matching portion thereof, thereby yielding the education resource identifier specifying the education resource.

7. The computer-implemented method of claim 5, wherein the predetermined time series of the data related to the predetermined education resources, or the portions thereof, comprise predetermined note taking data, or portions thereof, acquired from one or more further users of further digital writing systems.

8. The computer-implemented method of claim 1, wherein selecting the at least one note taking user interface setting for the digital writing system based on the education resource identifier comprises querying at least one predetermined note taking user interface setting for the digital writing system from a note taking user interface database, and wherein the at least one predetermined note taking user interface setting has been preselected for the education resource identifier, thereby selecting the at least one note taking user interface setting.

9. The computer-implemented method of claim 1, wherein selecting the at least one note taking user interface setting for the digital writing system based on the education resource identifier comprises applying a note strategy algorithm configured for:

querying, based on the education resource identifier, one or more predetermined note taking user interface settings for the digital writing system and corresponding note taking performance data scores from a note taking user interface database; and selecting at least one predetermined note taking user interface setting based on the corresponding note taking performance data scores, thereby selecting the at least one note taking user interface setting.

10. The computer-implemented method of claim 2, wherein the at least one note taking user interface settings for the digital writing system comprise at least one suggestion for user control for the audio sequence and/or the visual sequence of the education resource.

11. The computer-implemented method of claim 2, comprising applying, as the education resource progresses, a real-time note analyzing algorithm configured for:

spotting a lack of a key point and/or a mistake corresponding to a section of the education resource; and inviting and/or prompting the user via the user interface of the digital writing system to pause or rewind the audio sequence and/or the visual sequence in order to add more details and/or correct the mistake.

12. The computer-implemented method of claim 1, comprising, after an end of the education resource, applying a user assessment algorithm configured for:

prompting a user of the digital writing system to participate in a user assessment aimed at measuring a learning effect of the education resource; and running the user assessment.

13. The computer-implemented method of claim 12, wherein running the user assessment comprises:

applying an education resource comprehension algorithm configured to generate one or more assessment questions and corresponding one or more target answers based on the education resource specified by the education resource identifier;

prompting the user of the digital writing system to provide one or more answers to the one or more generated assessment questions via the user interface of the digital writing system; and evaluating the one or more answers provided by the user by comparing them to the generated corresponding one or more target answers, thereby computing at least one note taking performance data score.

14. A digital writing system for taking notes based on an education resource comprising:

a user interface;

an input device configured to acquire at least one time series of data related to a progression of the education resource, wherein the at least one time series of data includes an audio time series captured by at least one microphone, a video time series captured by at least one camera, or an ambient light time series captured by at least one ambient light sensor during the progression of the education resource, and wherein the digital writing system is configured for:

recognizing, by utilizing an education resource recognition algorithm, the education resource based on the at least one time series of data, thereby yielding an education resource identifier specifying the education resource;

selecting, by utilizing a note strategy algorithm, at least one note taking user interface setting for the digital writing system based on the education resource identifier;

modifying the at least one note taking user interface setting based on aggregated note-taking data from other users interacting with the education resource;

applying the at least one modified note taking user interface setting for the digital writing system as the education resource progresses; and generating or updating a note taking template in a user interface of the digital writing system based on the at least one modified note taking user interface setting.

15. The digital writing system of claim 14, wherein recognizing the education resource based on the at least one time series of data comprises applying an education resource recognition algorithm configured to compare the at least one time series of data, or one or more portions thereof, to predetermined time series of data related to predetermined education resources, or portions thereof.

16. The digital writing system of claim 14, wherein selecting the at least one note taking user interface setting for the digital writing system based on the education resource identifier comprises applying a note strategy algorithm configured for:
   querying, based on the education resource identifier, one or more predetermined note taking user interface settings for the digital writing system and corresponding note taking performance data scores from a note taking user interface database; and
   selecting at least one predetermined note taking user interface setting based on the corresponding note taking performance data scores,
   thereby selecting the at least one note taking user interface setting.

17. The digital writing system of claim 14, comprising applying, as the education resource progresses, a real-time note analyzing algorithm configured for:
   determining a lack of a key point and/or a mistake corresponding to a section of the education resource; and
   prompting a user via the user interface of the digital writing system to pause or rewind an audio sequence and/or a visual sequence in order to add more details and/or correct the mistake.

18. The digital writing system of claim 14, comprising, after an end of the education resource, applying a user assessment algorithm configured for:
   prompting a user of the digital writing system to participate in a user assessment aimed at measuring a learning effect of the education resource; and
   running the user assessment.

19. The digital writing system of claim 18, wherein running the user assessment comprises:
   applying an education resource comprehension algorithm configured to generate one or more assessment questions and corresponding one or more target answers based on the education resource specified by the education resource identifier; and
   prompting the user of the digital writing system to provide one or more answers to the one or more generated assessment questions via the user interface of the digital writing system; and
   evaluating the one or more answers provided by the user by comparing them to the generated corresponding one or more target answers,
   thereby computing at least one note taking performance data score.

20. An education resource system in a cloud comprising:
   a note taking user interface database;
   at least one communication interface configured for data exchange with at least one digital writing system for taking notes based on:
   obtaining at least one time series of data related to a progression of an education resource, wherein the at least one time series of data includes an audio time series captured by at least one microphone, a video time series captured by at least one camera, or an ambient light time series captured by at least one ambient light sensor during the progression of the education resource;
   recognizing, by utilizing an education resource recognition algorithm, the education resource based on the at least one time series of data, thereby yielding an education resource identifier specifying the education resource;
   selecting, by utilizing a note strategy algorithm, at least one note taking user interface setting for the at least one digital writing system based on the education resource identifier;
   modifying the at least one note taking user interface setting based on aggregated note-taking data from other users interacting with the education resource;
   applying the at least one modified note taking user interface setting for the at least one digital writing system as the education resource progresses; and
   generating or updating a note taking template in a user interface of the at least one digital writing system based on the at least one modified note taking user interface setting.

* * * * *